(12) United States Patent
Yin

(10) Patent No.: US 9,944,557 B2
(45) Date of Patent: Apr. 17, 2018

(54) BENTONITE MODIFIER, MODIFIED BENTONITE, AND USE THEREOF

(71) Applicant: Wuji Yin, Changsha (CN)

(72) Inventor: Wuji Yin, Changsha (CN)

( * ) Notice: Subject to any disclaimer, the term of this patent is extended or adjusted under 35 U.S.C. 154(b) by 221 days.

(21) Appl. No.: 14/379,791

(22) PCT Filed: Nov. 21, 2013

(86) PCT No.: PCT/CN2013/087626
§ 371 (c)(1),
(2) Date: Aug. 20, 2014

(87) PCT Pub. No.: WO2015/032131
PCT Pub. Date: Mar. 12, 2015

(65) Prior Publication Data
US 2015/0144029 A1    May 28, 2015

(30) Foreign Application Priority Data

| Sep. 6, 2013 | (CN) | 2013 1 0402159 |
| Sep. 6, 2013 | (CN) | 2013 1 0402377 |
| Sep. 18, 2013 | (CN) | 2013 1 0426887 |
| Sep. 18, 2013 | (CN) | 2013 1 0426910 |
| Sep. 18, 2013 | (CN) | 2013 1 0427214 |

(51) Int. Cl.
| C04B 14/10 | (2006.01) |
| C04B 16/00 | (2006.01) |
| C04B 28/04 | (2006.01) |
| C04B 18/16 | (2006.01) |
| C04B 40/00 | (2006.01) |

(52) U.S. Cl.
CPC ............ *C04B 16/00* (2013.01); *C04B 18/162* (2013.01); *C04B 28/04* (2013.01); *C04B 40/0039* (2013.01); *Y02W 30/94* (2015.05); *Y02W 30/95* (2015.05)

(58) Field of Classification Search
CPC .............................. C04B 14/10; C04B 16/00
See application file for complete search history.

(56) References Cited

U.S. PATENT DOCUMENTS

| 4,131,480 | A | * | 12/1978 | McCurrich | ............ | C04B 28/02 |
| | | | | | | 106/674 |
| 4,946,904 | A | * | 8/1990 | Akimoto | ................. | C04B 24/32 |
| | | | | | | 106/724 |
| 5,389,144 | A | * | 2/1995 | Burge | .................. | C04B 14/062 |
| | | | | | | 106/737 |
| 2003/0188669 | A1 | * | 10/2003 | Sobolev | ............. | C04B 40/0039 |
| | | | | | | 106/737 |

FOREIGN PATENT DOCUMENTS

| CN | 1485375 | A | 3/2004 |
| CN | 101397199 | A | 4/2009 |
| CN | 102030493 | A | 4/2011 |
| CN | 102151544 | A | 8/2011 |
| CN | 102358763 | A | 2/2012 |
| CN | 102617073 | A | 8/2012 |
| CN | 102659340 | A | 9/2012 |
| CN | 102757206 | A | 10/2012 |
| CN | 103145365 | A | 6/2013 |

OTHER PUBLICATIONS

CN 101397199 A Zhao, Xiuzhi et al. (Apr. 1, 2009) abstract only.*
CN 102942324 A Zhao, Hongyi et al. (Feb. 27, 2013) abstract only.*
CN 101397199 A Xiuzhi Zhao et al. (Apr. 1, 2009) abstract only.*
CN 102942324 Hongyi Zhao et al. (Feb. 27, 2013) abstract only.*
International Preliminary Report on Patentability dated Mar. 8, 2016 by the International Bureau (Forms PCT/IB/236, PCT/IB/373) in corresponding International Application No. PCT/CN2013/087626. (11 pages).
International Search Report (PCT/ISA/210) dated Jul. 9, 2014, by the Chinese Patent Office as the International Searching Authority for International Application No. PCT/CN2013/087626.
Written Opinion (PCT/ISA/237) dated Jul. 9, 2014, by the Chinese Patent Office as the International Searching Authority for International Application No. PCT/CN2013/087626.
Li Qingfu et al., "Experiment on Impermeability of Plastic Concrete", Industrial Construction, Apr. 30, 2007, vol. 37, No. 4, pp. 48-51 (with English Abstract).
Zhongcai Jin, "Experimental Research on Plastic Concrete Diaphragm Wall Mix Proportion", Journal of Taiyuan University of Technology, Jul. 31, 2012, vol. 43, No. 4, pp. 519-522 (with English Abstract).

* cited by examiner

*Primary Examiner* — Paul D Marcantoni
(74) *Attorney, Agent, or Firm* — Buchanan Ingersoll & Rooney PC

(57) ABSTRACT

The present disclosure relates to a bentonite modifier, comprising a water-soluble thiosulfate, a water-soluble alcohol compound, and a water-soluble amine compound, wherein the amounts of thiosulfate, the alcohol compound, and the amine compound are in the ratio of (0.3~1):(0.3~1):(0.3~1). The present disclosure further relates to a bentonite-containing cement additive capable of resisting permeation and salt corrosion, comprising bentonite and said modifier, wherein the content of the bentonite modifier is 0.2~5% of the bentonite by weight. Meanwhile, the present disclosure also provides use of the modified bentonite.

10 Claims, No Drawings

BENTONITE MODIFIER, MODIFIED BENTONITE, AND USE THEREOF

FIELD OF THE INVENTION

The present disclosure relates to a bentonite modifier, a modified bentonite, preparation methods thereof, and the use of the bentonite in the field of cement production. Specifically, the present disclosure relates to a bentonite-containing cement additive capable of resisting permeation and salt corrosion, and a manufacturing method thereof. Meanwhile, the present disclosure further provides a method for manufacturing cement using recycled ash from the dry-process rotary kiln as a substituted slag powder.

BACKGROUND OF THE INVENTION

Bentonite, also known as amargosite or swell soil, is clay rock mostly consisting of montmorillonite. The chemical formula of montmorillonite is $4SiO_2 \cdot Al_2O_3 \cdot H_2O$, and the crystal structure of montmorillonite is a 2:1 phyllosilicate which is formed in such a manner that two silicon-oxygen tetrahedral sheets sandwich one aluminum-oxygen octahedral sheet. Bentonite has a series of physicochemical properties such as water absorbability, swelling capacity, dispersion and suspension property, cohesiveness, the absorbability of organics, catalytic activity, thixotropy, plasticity, lubricity and cation exchange capacity and the like, as well as good thermostability and chemical stability.

Bentonite has numerous excellent performances due to its unique mineral structure and chemical property of crystallization. Accordingly, bentonite, especially modified bentonite, is widely used in various industries, such as, as a mud thickener, an emulsion stabilizer, a plasticizer, an adsorbent or a lubricant in the oil drilling industry, casting and metallurgical industry, coating and ink industry, farming and livestock husbandry and textile industry, paper industry, daily chemical industry and food processing, and petrochemical industry, as a clean agent or an adsorbent in environment protection, and as clay raw materials of low iron siliceous in producing bentonite flashings, bentonite daub and bentonite sealing rod and the like.

However, although bentonite has excellent water swelling capacity, dispersion and suspension property, water-holding capacity, lubricity, stability, etc., either non-modified bentonite nor modified bentonite in the prior art is fit for being blended into cement or concrete as waterproof additives, waterproof and impervious additives, or additives capable of resisting permeation and salt corrosion. The reason for this lies in that, montmorillonite, the main mineral of bentonite, is a type of clay mineral, which still has the properties of clay minerals. In the complex liquid medium environment of ionic-type strong alkaline cement concrete, under the combined action of hydrated calcium silicate gel, sulfoaluminate, aluminoferriate, the crystal mineral of calcium hydroxide, and complex ionic-exchanges in the course of cement hydration, a fusion zone or strengthening transition zone could not be effectively formed between bentonite or modified bentonite and hydrated minerals of cement. Besides, the bentonite is either subject to untimely full-expansion, which gives rise to its separation from hydrated minerals of cement and formation of dried-up channels, or to damage or suppression of the original excellent performances. In addition, the cementing property of the hydrated minerals of cement is weakened simultaneously by clay minerals.

Cement, as the cementing material of concrete, is the most widely used hydraulic cementing material. After hardening, a large number of microchannels and dried-up, heat-expansion microcracks are generated. These microchannels and microcracks provide paths and create conditions for permeation and salt corrosion, which result in permeation and salt corrosion of cement, concrete products, or concrete constructions. Especially in the engineering constructions such as dams, tunnels, culverts, ditches, pools, towers, dikes, wharf, etc., the problems of resisting permeation and salt corrosion become the hardest engineering technical problem.

Currently, the technical methods for solving the problems of leakage and salt corrosion existing in cement and concrete works can be summed up in four categories: setting up one or more isolating layers for resisting permeation; blending an expanding agent such as calcium sulfate to make the work more dense; blending a large quantity of expensive high polymer material to block pores and cracks; using special cement; or employing the combination of the above categories of methods. These methods result in high costs of constructions and maintenances in different degrees.

In addition, when cement is mixed with dinas to produce concrete for construction, during the process of hydration and hardening thereof, the water on the surface of the concrete evaporates and runs off easily. In particular, for lowering production cost, current cement manufacturers add a large quantity of industrial waste residue or non-plastic material such as limestone, raw gangue, or black shale into cement. Rather low surface energy and poor association capacity with water with respect to the waste residue or filter particles in the cement, would lead to the rapid water loss and thus drying of the surface or almost the entirety of the concrete. Furthermore, the particles of silicate minerals in cement cannot be hydrated to be calcium silicate gel and crystalline, and the waste residue particles with potential activity in cement also lose the alkaline water and cannot be hydrated, thus resulting in low strength on the surface of the concrete, serious sugaring, and even spongy surface.

At present, the methods for solving sugaring of cement concrete can be roughly classified into three categories: covering the surface with films or petates and spraying water; in the course of cement production or cement mixing, adding a large amount of water-soluble macromolecular water-retaining material, or spraying water at regular time for humidification simultaneously; spraying a water retention and isolating agent on the surface. Because of economic reasons or the incompatibility of organic and inorganic substances, the above mentioned methods can be performed merely in important projects.

For the above reasons, at home and abroad there still lacks a modifier which enables bentonite to play the role of waterproofing and impermeability, and a texturizer which can adjust and improve the performance of bentonite in the medium environment of cement concrete, so that there is a shortage of a bentonite modifier which can be used in waterproofing, resisting permeation and salt corrosion, avoiding sugaring of cement concrete as well as bentonite modified with said bentonite modifier.

In addition, during the process of cement production, generally, due to the blasting action, either "kiln dust", or "kiln dust" and recycled ash" is generated. "Kiln dust", as the name implies, is the fly ash collected by a rear kiln cyclone and a dust-precipitator and is taken along with flue gas from the interior of the rotary kiln where the clinker is prepared by calcining.

Currently, kiln dust released by cement plants can be classified into two categories. One is the kiln dust released by the rotary kilns of the ordinary dry process, wet process or semi-dry process, comprising fly ash from the interior of the rotary kiln that leaks or escapes from the pre-heater kiln (without a decomposition furnace) system. The other is the fly ash (kiln dust) with a high content of chlorine-alkali from the interior of the rotary kiln, released by the bypass system provided at the rear kiln chamber or the uptake of the rear kiln chamber in the new dry process cement rotary kiln (with a decomposition furnace). The fly ash has different properties from the "recycled ash" released by the pre-heater system of new dry process kilns. The properties of kiln dust are between those of clinker and raw materials. The high temperature kiln dust released by the feed-end chamber bypass system of the new dry process cement kiln is generally added into a cement mill as a cement admixture, and other kiln dust of rotary kiln generally returns to the interior of the kiln with raw materials to be utilized or added into a cement mill as a cement admixture.

"Recycled ash" means the superfine particles, which is released during production of new dry process rotary kiln with waste gas from a decomposing furnace and a five-stage pre-heater. The new dry process rotary kiln provided with the by-pass system would generate numerous "kiln dust" from the interior of the rotary kiln and the kiln end chamber. Generally, the dust efficiency of the first-stage cyclone of the pre-heater in a kiln system is designed to be in the range from 95% to 97%, and the amount of superfine powder released along with the high temperature waste gas higher than 300° C. at the outlet of the first-stage cyclone is often more than 5% of the adding amount of raw materials. Such superfine powder is recycled via a humidifier tower and a dust-precipitator and referred as the recycled ash. Currently, when the mills and the kiln are opened synchronously, the recycled ash, together with the recycled ash of raw materials collected by the raw material mill, is continuously added into the raw material powder ground by the raw material mill, so as to be conveyed into the raw material homogenizing silo, or be conveyed into the raw material silo directly, or when the raw materials mill stops milling or the system raw materials silo malfunctions, be conveyed into the kiln elevator directly. Compared with ordinary raw materials having a controlled composition ratio, the recycled ash of the kiln system has a higher saturation ratio, lower silica ratio, and higher contents of aluminium and iron, as well as typically higher content of harmful elements. In other words, there is a big composition difference between the recycled ash and ordinary raw materials, which significantly affects the kiln system. Especially, when the raw material mill stops and the kiln is open, the accumulation of the recycled ash in the raw material silo would results in abnormal fluctuations of the raw material compositions, which has a strong impact on the kiln conditions and the yield and quality thereof. Therefore, when the raw material mill stops, there is no other choice than directly feeding the recycled ash into the kiln system, but the composition problem of the recycled ash will still seriously affect the kiln conditions and the product quality thereof. Besides, as the recycled ash enters the raw material homogenizing silo or directly enters the kiln, the elementary compositions which are bad for the production in the dry process rotary kiln such as chlorine, alkali and sulfur and the like contained in the recycled ash would circulate and gather, which may cause substantial harm to kiln conditions and product quality. Therefore, some enterprises have to set up a by-pass system (generating kiln dust) to reduce the damage caused by the circulation and enrichment of chlorine, alkali and sulfur, and also a small part of enterprises have to discard part of recycled ash.

On the other hand, in order to reduce production cost, in the current cement production, 20% to 50% industrial waste residue by weight of the cement as blending materials need to be added, depending on the types and strength grades of the cement, followed by being ground together, or after grinding and powder selecting a large quantity of waste residue is added into clinker powder or cement powder, to produce finished cement. Currently, the quantity demand for blending materials or slag powder is high, and therefore it is difficult to meet the demand of cement production. To reduce the production cost, cement manufacturing enterprises have to use a large quantity of limestone, even raw gangue, black shale, clay minerals as blending materials. These blending materials that seriously degrade the performance of cement concrete have caused a large number of bad engineering projects.

SUMMARY OF THE INVENTION

In order to solve the problems existing in the prior art, the present disclosure provides a bentonite modifier and a modified bentonite. The performances of cement concrete can be efficiently improved by using the bentonite modifier or the modified bentonite.

Firstly, the present disclosure provides a bentonite modifier, comprising a water-soluble thiosulfate, a water-soluble alcohol compound and a water-soluble amine compound, wherein, by weight, the thiosulfate to the alcohol compound to the amine compound is (0.3-1):(0.3-1):(0.3-1).

Preferably, the mass ratio of the thiosulfate to the alcohol compound to the amine compound is (0.5~1):(05~1):(0.5~1).

In one preferred embodiment of the present disclosure, the water-soluble thiosulfate is at least one selected from the group consisting of lithium thiosulfate, sodium thiosulfate, and potassium thiosulfate.

In one preferred embodiment of the present disclosure, the water-soluble alcohol compound is at least one selected from the group consisting of polyol, poval, and polyethylene glycol, wherein, preferably, the polyol is ethylene glycol and/or isopropanol, and the polyethylene glycol is at least one selected from the group consisting of polyethylene glycol 200, polyethylene glycol 400, and polyethylene glycol 600.

In one preferred embodiment of the present disclosure, the water-soluble amine compound is at least one selected from the group consisting of triethanolamine, isopropanol amine, hydrazine hydrate, water-soluble alkylamine, and alkenamides.

The present disclosure further provides a modified bentonite, comprising bentonite and said modifier, wherein, the adding amount of the bentonite modifier is 0.2~5%, preferably 0.2~4% by weight of the bentonite, and said bentonite is the commonly used inorganic bentonite or organic bentonite.

The present disclosure further provides a bentonite-containing cement additive capable of resisting permeation and salt corrosion, comprising the modified bentonite of the present disclosure and a bentonite texturizer, the bentonite texturizer being a mixture of active silica powder and a water reducer, wherein, based on weight, the modified bentonite to the active silica powder to the water reducer is 100:(3~30):(0.3~3.5).

In one preferred embodiment of the cement additive of the present disclosure, the active silica powder is at least one kind of fine powder with 80 μm screen residue ≤12% manufactured from a silicon industrial waste residue, an amorphous $SiO_2$ powder, and a natural $SiO_2$ mineral. More preferably, said amorphous $SiO_2$ powder is white carbon black, and said natural $SiO_2$ mineral is silica stone or diatomite.

In one preferred embodiment of the cement additive of the present disclosure, said water reducer is at least one selected from the group consisting of naphthalene-based water reducers, melamine sulfonate-based water reducers, polycarboxylate-based water reducers, sulfamate-based water reducers, and modified lignosulfonate-based water reducers.

A method of preparing the bentonite-containing cement additive capable of resisting permeation and salt corrosion of the present disclosure comprises the steps of mixing the components, grinding the resulting mixture into a powder with less than 12% of 80 μm screen residue, thus obtaining the desired product; or, mixing the powdered components homogenously, thus obtaining the desired product; or mixing the components homogenously into a slurry, thus obtaining the desired product.

The use of the bentonite-containing cement additive is as follows. The bentonite-containing additive is added in the course of cement milling, or evenly added into the cement powder or clinker powder, or added in the course of making cement, for producing cement or concrete capable of resisting permeation and salt corrosion. The adding amount of the bentonite-containing cement additive is in the range from 3 to 15% by weight of the cement.

The present disclosure also provides a cement capable of resisting permeation and salt corrosion, comprising cement clinker, admixtures, and the bentonite-containing cement additive capable of resisting permeation and salt corrosion, wherein the content of the bentonite-containing cement additive capable of resisting permeation and salt corrosion accounts for 4 to 20% of the total weight of the cement.

In one preferred embodiment of the present disclosure, the content of the bentonite-containing cement additive capable of resisting permeation and salt corrosion accounts for 5 to 15% of the total weight of the cement.

A preparation method of the cement capable of resisting permeation and salt corrosion of the present disclosure comprises the following steps: adding the bentonite-containing cement additive capable of resisting permeation and salt corrosion, active silica, water reducer, conventional admixtures, and other additives to cement clinker according to a predetermined ratio, adding the resulting mixture into a cement mill, and grinding the mixture to obtain a cement capable of resisting permeation and salt corrosion; or, first making bentonite, active silica, and water reducer into a powder with 80 μm screen residue <12%, then according to a predetermined ratio adding the resulting powder into a finely ground clinker powder or cement powder to obtain a cement capable of resisting permeation and salt corrosion after homogeneous mixing; or, in the course of cement operation, according to a predetermined ratio making bentonite, active silica powder, and a water reducer into a powder with 80 μm screen residue <12%, adding the resulting powder into the ingredients of cement, concrete or mortar to obtaining the concrete or mortar capable of resisting permeation and salt corrosion after homogeneous mixing.

In addition, the present disclosure further provides a method for producing cement by using recycled ash of a dry process rotary kiln as a substituted slag powder, comprising: using said modified bentonite to modify the recycled ash of the dry process rotary kiln, and adding the modified recycled ash as substituted slag powder for cement production into the cement powder having qualified fineness after being ground by a cement mill, or adding the modified recycled ash as a substituted slag powder for cement production into the powder-selecting system of a cement mill, wherein the adding amount of the bentonite powder used for the modification of the recycled ash is in the ranger from 3% to 20% by weight of the recycled ash, and the adding amount of the modified recycled ash is in the ranger from 2% to 12% by weight of finished cement.

The present disclosure further relates to a method for solving the problem of cement concrete sugaring, comprising making the modified bentonite into a powder with 80 μm screen residue ≤18% as a modified water retention component, adding the modified bentonite powder into a cement powder and homogenizing the resulting mixture to produce a cement powder containing bentonite; alternatively, adding the modified bentonite as a modified water retention component at the time of cement grinding and blending together with clinker and other admixtures into a cement mill to be ground so as to produce cement, wherein the adding amount of the modified bentonite is in the range from 1.5% to 20% by weight of the cement, thus preventing sugaring of cement concrete.

Through studying, the inventors of the present disclosure consider that the technical principles of the present disclosure can be explained as follows, which are not to limit the scope of the present disclosure.

(1) The polybasic complex of a thiosulfate, an alcohol, or an amine does not only has the effects of efficient iron activation and adsorption catalysis on clinker minerals and activated blending materials in cement, but also can promote the development of calcium silicate gel and refine crystal minerals while accelerating the hydration of cement minerals, thus significantly improving the strength of cement stone. As a bentonite modifier, said polybasic complex is beneficial for improvement of strength and performance of cement concrete.

(2) Bentonite, as well as universal inorganic or organic modified bentonite has excellent absorption and exchange capacity to poly complexes of water-soluble thiosulfates, alcohols, and amines. The bentonite particles modified by the modifier of the present disclosure is in a state between hydrophily and hydrophobicity. In the alkaline medium environment of freshly blended cement concrete, said bentonite particles can release modifier components such as a thiosulfate, an alcohol, or an amine to cement seriflux round the bentonite particles to accelerate the hydration of cement minerals round the bentonite particles, while preventing both calcium and magnesium ions from rapidly entering the layered space of montmorillonite so as to prevent bentonite from rapid water swelling. In addition, an enhanced transition region can be formed by hydrated calcium silicate gel and micro-crystal round the bentonite particles, and thus allows a colloidal silica oxide to be absorbed on the surface of montmorillonite minerals. While the modifier entering the cement seriflux to be a cement activator, more spaces between layers are free up, thus gradually absorbing a large number of organic macromoleculars of the water reducer in the cement concrete in the spaces between layers, which not only gradually increases the hydrophobicity of the bentonite, but also enables the bentonite to keep its humidity-adjusting, swelling, colloid index, and lubricating capacities. As a result, in the presence of water, the restrained bentonite particles can block and fill the capillary channels and cracks in time in the form of gel, which can play the role of resisting permeation and salt corrosion when used in cement concrete.

(3) In the medium environment of cement concrete, by using the inter-layer adsorption exchange activity of the bentonite or modified bentonite tempered via the interaction of the texturizer i.e. active $SiO_2$ and the high adsorption water reducer, the compatibility of cement hydrated minerals can be improved, thus not only increasing the concrete strength, but also restraining and isolating the salt corrosion effect of salt water.

(4) By using the excellent properties of colloid, swelling-shrinkage and swelling of the tempered and modified bentonite to block capillary pores and microcracks in time as well as to block and eliminate the conditions of salt corrosion, the problem of resisting permeation and salt corrosion of concrete construction can be solved.

(5) By using the properties of colloid, swelling-shrinkage and swelling of the tempered and modified bentonite, the destructive impacts of the alternation of drying and wetting, heat-expansion and thawing circulations on the concrete structure can be defused.

The advantageous effects of the present disclosure are as follows.

1. The bentonite modifier of the present disclosure has the advantages of wide raw material sources, simple preparation method, and reliable technical effects.

2. The natural bentonite resources are widespread with big reserves, and of low-costs.

3. Using the bentonite modified by the bentonite modifier of the present disclosure in cements can effectively improve strength and resistance to permeation and salt corrosion thereof.

DETAILED DESCRIPTION OF THE EMBODIMENTS

The present disclosure will be described in detail in combination with examples, but the scope of the present disclosure is not limited to the following examples.

Various materials used in the examples of the present disclosure are commercially available.

Various performance indexes of the bentonite-containing concrete of the present disclosure were tested according to the provisions as set forth in *Standard for Test Methods of Long-term Performance and Durability of Ordinary Concrete* (GBT50082-2009).

Example 1

A bentonite modifier was prepared by homogeneously mixing lithium thiosulfate, ethylene glycol, triethanolamine, and water in the mass ratio of 1:1:1:1.

The bentonite modifier was mixed with bentonite to obtain a modified bentonite, wherein the adding amount of the bentonite modifier was 0.4% on a dry weight basis of the bentonite.

Example 2

A bentonite modifier was prepared by homogeneously mixing sodium thiosulfate, ethylene glycol, isopropanolamine, and water in the mass ratio of 0.85:1:1:1.2.

When milling a block granular bentonite, the obtained bentonite modifier was continuously and uniformly added into the bentonite. The resulting mixture was then ground by a mill to obtain a modified bentonite, wherein the adding amount of the bentonite modifier was 1.5% on a dry weight basis of the bentonite.

The modified bentonite was added into a 32.5-grade cement powder, followed by homogenization, wherein the adding amount of the modified bentonite was 7% by weight of the cement. The compressive strength of the cement was improved by 5 Mpa in 3 or 28 days. When the cement was used in the construction of a biogas plant, there was no indication of leakage or salt corrosion.

Example 3

A bentonite modifier was prepared by homogeneously mixing potassium thiosulfate, ethylene glycol, isopropanolamine, triethanolamine, and water in the mass ratio of 1:1:0.5:0.3:1.

The obtained bentonite modifier was added into a bentonite powder and stirred homogeneously, wherein the adding amount of the bentonite modifier was 1% by weight of the bentonite powder. After 8 hours of aging, a modified bentonite which can be used in cement and concrete was obtained.

The modified bentonite was added into a 42.5-grade cement powder, followed by homogenizing, wherein the adding amount of the modified bentonite was 10% by weight of the cement. The 3-day compressive strength of the cement was improved by 5 Mpa, and the 28-day compressive strength thereof was improved by 5 Mpa. When the cement was used in the construction of a kitchenware cleaning pool, after two years of observation, there was no indication of leakage or salt corrosion.

Example 4

A bentonite modifier was prepared by homogeneously mixing lithium thiosulfate, ethylene glycol, poval, triethanolamine, and water in the mass ratio of 1:0.5:0.2:0.8:1.5.

During purification of bentonite, the obtained modifier was added into a bentonite suspension and fully stirred, followed by aging for 2 h, wherein the adding amount of the modifier was 0.4% on a dry weight basis of the bentonite. The resulting mixture was then dried and milled according to a conventional process, to obtain a modified bentonite which can be used in cement and concrete.

The modified bentonite was added into a 32.5-grade cement powder, followed by homogenization, wherein the adding amount of the modified bentonite was 8% on a dry weight basis of the cement. The 3-day compressive strength of the cement was improved by 4 Mpa, and the 28-day compressive strength was improved by 4 Mpa. When the cement was used in the construction of a manure pit, after two years of observation, there was no indication of leakage or salt corrosion.

Example 5

A bentonite modifier was prepared by mixing lithium thiosulfate, ethylene glycol, triethanolamine, a double chain quaternary ammonium salt, and water in the mass ratio of 1:1:0.85:0.15:1.2 into a solution.

The obtained bentonite modifier was added into a bentonite powder and stirred homogeneously, wherein the adding amount of the bentonite modifier was 3% on a dry weight basis of the bentonite powder. After 8 hours of aging, a modified bentonite which can be used in cement and concrete was obtained.

The modified bentonite was added into a 32.5-grade cement powder, followed by homogenization, wherein the adding amount of the modified bentonite was 7% by weight of the cement. The compressive strength of the cement was improved by 7 Mpa in 3 days, and the 28-day compressive strength thereof was improved by 8.1 Mpa. When the cement was used in the construction of sewer lines, after two years of observation, there was no indication of leakage or salt corrosion.

Example 6

The modified bentonite of Example 2, a water reducer, and silica stone were blended in the mass ratio of 100:0.3:25, and then ground into a fine powder with fineness <12%, thus obtaining a bentonite-containing cement and concrete additive capable of resisting permeation and salt corrosion.

The above bentonite-containing additive was added into 52.5-grade cement, followed by homogenizing. The adding amount was 3% by weight of the cement. When the resulting cement was used in the construction of coastal dikes, after two years of observation, there was no indication of leakage or salt corrosion.

Example 7

The modified bentonite powder of Example 3 (with a fineness of 80 μm screen residue <12%, and a montmorillonite content of 91%), industrial by-product silicon powder (known as white carbon black), and a powdered melamine-based water reducer in the mass ratio of 100:10:0.8 were blended and then homogenized, to obtain a bentonite-containing concrete additive capable of resisting permeation and salt corrosion.

This additive, in replacement of 5% of slag powder was added into a clinker powder, and blended to form 42.5-grade cement, which was used for the construction of culverts. Over two years of observation, no indication of leakage or salt corrosion had been found.

Example 8

The modified bentonite of Example 4, an aminosulfonic-based water reducer and diatomite concentrate as the texturizer, a commercially available ZC-$R_1$-type bentonite composite modifier as the bentonite modifier were added in the mass ratio of 100:30:1.2 into a mill to be ground into powder. In the grinding process, the ZC-$R_1$-type bentonite modifier was continuously added as instructed, to prepare a finished powder with a fineness of 80 μm screen residue <12%, i.e. a bentonite-containing concrete additive capable of resisting permeation and salt corrosion.

This additive was added into cement during the mixing process of the cement. The adding amount of this additive was 6% by weight of the cement. The cement was used in the construction of a sewage pool. After two years of observation, no indication of leakage or salt corrosion has been found.

Example 9

The modified bentonite of Example 5, silica fume, and powdered modified lignosulfonate water reducer used as raw materials were mixed together in the mass ratio of 100:11.8:3.2, followed by homogenization, to prepare a finished powder, i.e. a bentonite-containing concrete additive capable of resisting permeation and salt corrosion.

This additive was added in a cement in the course of blending mortar used for bathroom. The adding amount was 5% by weight of the cement. When the cement was used in the construction of a sewage pool, after two years of observation, no indication of permeation or salt corrosion was found.

Example 10

This example employed 42.5-grade cement in a cement plant mainly used in residential and water conservancy constructions, wherein cement blending materials included slag, coal ash, limestone in a ratio of 1:1:1. The average of the total amount of blending materials was 28% of the cement, the fineness of finished cement being 80 μm screen residue ≤3%.

Block granular sodium-based bentonite was used, wherein the average content of montmorillonite was tested to be 86%.

Silica fume as the active silica, and a naphthalene based water reducer were used. Both were ordinary products commercially available. The modified bentonite of Example 1, the silica fume, and the naphthalene based water reducer were blended uniformly in a mass ratio of 100:5:1.6, to obtain a bentonite-containing cement additive capable of resisting permeation and salt corrosion.

Preparation of the cement capable of resisting permeation and salt corrosion of this example was as follows.

Modified bentonite was crushed into a modified bentonite powder with 80 μm screen residue <12%, and then blended into finely ground clinker powder with the silica fume, the water reducer, and slag powder in proportion, followed by homogenizing, to obtain the bentonite-containing cement capable of resisting permeation and salt corrosion. The total weight of the bentonite and the texturizer was 5% by weight of the cement product, and the adding amount of original slag powder was reduced by 5%. The obtained cement capable of resisting permeation and salt corrosion was used for preparing concrete.

The performance of the concrete capable of resisting permeation and salt corrosion of this example was tested in the following way.

The anti-permeability level of the concrete produced in this Example was tested to be S12. The trial produced 5000 tons of bentonite-containing cement capable of resisting permeation and salt corrosion was used in tunnel engineering without adding a swelling agent. Over three years of observation, no indication of leakage or salt corrosion was found.

The cement product of this example had a standard consistency of 22.1%, an average initial setting time of 151 minutes, an average final setting time of 213 minutes, an average three-day compressive strength of 29.9 MP, an average three-day rupture strength of 3.1 MPa, an average 28-day compressive strength of 50.8 MPa, and an average 28-day rupture strength of 5.1 MPa.

Comparative Example 1

Concrete was produced by blending the cement of Example 10 with a swelling agent. In the same testing condition, obvious damage caused by leakage and salt corrosion appeared. During the construction of tunnel engineering, a swelling agent which was 12% by weight of the cement as anti-permeability agent was blended to the cement. However, due to the permeation of water in the geologic environment, sulfate corrosion was still very serious.

The originally used ordinary cement of 42.5 grade had a standard consistency of 22.8%, an average initial setting time of 162 minutes, an average final setting time of 215 minutes, an average three-day compressive strength of 25.8 MPa, an average three-day rupture strength of 2.8 MPa, an average 28-day compressive strength of 48.4 MPa, and an average 28-day rupture strength of 4.8 MPa.

From the results of Example 10 and Comparative Example 1, it can be seen that, compared with Comparative Example 1, the effects of resisting permeation and salt corrosion of the bentonite-containing cement concrete capable of resisting permeation and salt corrosion in Example 10 was more satisfactory. With respect to mechanical properties, the product of Example 10 had an average three-day compressive strength improved by 4 MPa and an average 28-day compressive strength improved by 2.4 MPa compared with the product of Comparative Example 1.

Example 11

The raw materials used in the experiment were as follows.

A 42.5-grade cement in a dry process rotary kiln of a cement plant was used, wherein the production process of the cement was as follows. Clinker and blending materials were ground to be clinker powder and slag powder respectively. The clinker powder and slag powder were blended into ordinary 42.5-grade cement to be supplied to tunnel engineering. The blending amounts of slag powder and clinker powder were 30% and 70% of the cement, respectively. The blending materials comprising mineral waste residue, coal cinder, plus 5% of gypsum were ground to be the slag powder.

The modified bentonite of Example 2, commercially available pipe ash "silica fume", and melamine powder water reducer were used.

In this example, the mass ratio of the modified bentonite to silica fume to the water reducer was 100:5:0.9.

The preparation of the cement capable of resisting permeation and salt corrosion of this example was as follows. The modified bentonite of Example 2 was firstly crushed into bentonite powder with 80 μm screen residue <12%, and then blended into finely ground clinker powder with the silica fume, the water reducer, and slag powder in proportion, followed by homogenizing, to obtain the bentonite-containing cement capable of resisting permeation and salt corrosion. The total weight of the bentonite and the texturizer was 5% by weight of the cement product, and the adding amount of original slag powder was reduced by 5%. The obtained cement capable of resisting permeation and salt corrosion was used for preparing concrete.

The performance of the concrete capable of resisting permeation and salt corrosion was tested in the following way.

The anti-permeability level of the concrete produced in this example was tested to be S12. The trial produced 5000 tons of bentonite-containing cement capable of resisting permeation and salt corrosion was used in tunnel engineering without adding a swelling agent. Over three years of observation, there was no indication of leakage, salt corrosion, or sugaring.

The cement product of this example had a standard consistency of 22.3%, an average initial setting time of 153 minutes, an average final setting time of 215 minutes, an average three-day compressive strength of 30.1 MPa, an average three-day rupture strength of 3.1 MPa, an average 28-day compressive strength of 51.8 MPa, and an average 28-day rupture strength of 5.2 MPa.

Comparative Example 2

Concrete was produced by blending the cement of Example 11 with a swelling agent. In the same testing condition, obvious damage caused by leakage and salt corrosion appeared. During the construction of tunnel engineering, a swelling agent which was 12% by weight of the cement as waterproof anti-permeability agent was blended to the cement. However, due to severe permeation of water in the geologic environment, sulfate corrosion was still very serious, and a lot of sugaring appeared.

The cement product of this comparative example had a standard consistency of 22.9%, an average initial setting time of 165 minutes, an average final setting time of 217 minutes, an average three-day compressive strength of 25.3 MPa, an average three-day rupture strength of 2.8 MPa, an average 28-day compressive strength of 48.1 MPa, and an average 28-day rupture strength of 4.8 MPa.

Analysis of Measurement Results:

From the results of Example 11 and Comparative Example 2, it can be seen that, compared with Comparative Example 2, the bentonite-containing cement and concrete capable of resisting permeation and salt corrosion of the Example 11 had more satisfactory effects of resisting permeation and salt corrosion. As for the mechanical properties, compared with Comparative Example 2, the product of Example 11 had a three-day compressive strength increased by 4.8 MPa and a 28-day compressive strength increased by 3.7 MPa.

Example 12

Raw Materials for Experiment

A special 42.5-grade cement from a cement plant producing low-aluminum dam clinker was used. The cement was mainly used for coastal burrock engineering and wave cone block. The cement blending materials comprised mineral waste residue and coal ash in a ratio of 1:1, and accounted for 30% the amount of the cement in average. The finished cement had a fineness of 80 μm screen residue ≤5%.

The modified bentonite of Example 3, diatomite concentrate, and a naphthalene based water reducer commercially available were used.

In this example, the adding amounts of the modified bentonite, the texturizer diatomite, and the naphthalene based water reducer were in a ratio of 100:28:1.5.

Preparation of the cement capable of resisting permeation and salt corrosion of this example was as follows.

The total adding amount of the bentonite and the bentonite texturizer (i.e. diatomite and water reducer) was 8% by weight of the total cement. Meanwhile, the amount of slag was reduced by 8%. The existing technique was adopted to blend and mill the materials to produce the cement capable of resisting permeation and salt-corrosion. The power consumption for milling per ton of cement was reduced by 5 KW·h, and the cost of per ton of cement was substantially kept unchanged. 5000 tons of bentonite-containing cement capable of resisting permeation and salt-corrosion was trial produced by using the method of the present disclosure. The obtained bentonite-containing cement capable of resisting permeation and salt-corrosion was used to produce concrete.

The performance of the concrete capable of resisting permeation and salt corrosion was tested in the following way.

The anti-permeability level of the concrete produced in this example was tested to be S10. The trial produced 5000 tons of cement was used for coastal burrock engineering. During blending of the concrete, no silica fume or calcium sulfate-based swelling agent was added. No obvious indication of stripping caused by seawater corrosion was found over 3 years of observation, and thus the effects of resisting permeation and salt corrosion were rather satisfactory.

The bentonite-containing cement capable of resisting permeation and salt corrosion had a standard consistency of 22.2%, an average initial setting time of 183 minutes, an average final setting time of 249 minutes, an average three-day compressive strength of 23.9 MPa, an average three-day rupture strength of 2.5 MPa, an average 28-day compressive strength of 48.9 MPa, and an average 28-day rupture strength of 4.8 MPa.

Comparative Example 3

The cement of Example 12 was used. According to the provisions of the GBT50082-2009, the concrete impervious grade was S4. In coast burrock engineering, special cement of 42.5 grade plus silica fume, water reducer, and calcium sulfate swelling agent were used to blend concrete. However, the stripping of burrock concrete caused by salt corrosion was still very serious, and maintenance costs thereof were high.

The cement product of this comparative example had a standard consistency of 22.1%, an average initial setting time of 176 minutes, an average final setting time of 248 minutes, an average three-day compressive strength of 20.8 MPa, an average three-day rupture strength of 2.3 MPa, an average 28-day compressive strength of 46.3 MPa, and an average 28-day rupture strength of 4.5 MPa.

Analysis of Measurement Results:

From the results of Example 12 and Comparative Example 3 it can be seen that, compared with Comparative Example 3, the product of Example 12 had great improvement on the effects of resisting permeation and salt corrosion. As for the mechanical properties, the three-day compressive strength and 28-day compressive strength of the product of Example 12 compared with that of Comparative Example 3 had been respectively improved by 3.1 MPa and 2.6 MPa.

Example 13

Materials for Experiments

A 42.5-grade cement was used, which was produced by grinding clinker and blending materials to clinker powder and slag powder respectively, and blending the resulting clinker powder and the slag powder. The blending materials that were ground to the slag powder were formed by mineral waste residue, coal ash, and 3% of anhydrite. The cost of the slag powder was 183 RMB/t. The amounts of clinker powder and slag powder used accounted for 28% and 72% of the 42.5-grade cement, respectively.

The modified bentonite of Example 4, silica fume, and a naphthalene-based water reducer commercially available were used.

In this example, the mass ratio of the modified bentonite to the silica fume to the water reducer was 100:12:3.

Preparation of the cement capable of resisting permeation and salt corrosion of this example was as follows.

According to the existing technique of cement production, during the blending of the finished product, the components resisting permeation and salt corrosion were pre-mixed and then added to fine-grained cement powder, followed by homogenizing, to prepare the bentonite-containing cement capable of resisting permeation and salt corrosion, wherein the adding amount of the components was 7% by weight of the total cement. Meanwhile, the original amount of the slag powder was reduced by 7%. 5000 tons bentonite-containing cement capable of resisting permeation and salt corrosion was produced. The obtained bentonite-containing cement capable of resisting permeation and salt-corrosion was used to produce concrete.

The performance of the bentonite-containing concrete capable of resisting permeation and salt-corrosion of this example was tested in the following way.

The anti-permeability level of the concrete produced in this example was tested to be S12. The trial produced 5000 tons of bentonite-containing cement capable of resisting permeation and salt corrosion was used in subway engineering without adding a swelling agent. The trial engineering sections indicated no leakage or salt corrosion over 2 years of observation.

The obtained bentonite-containing cement capable of resisting permeation and salt corrosion had a standard consistency of 22.3%, an average initial setting time of 151 minutes, an average final setting time of 213 minutes, an average three-day compressive strength of 31.9 MPa, an average three-day rupture strength of 3.3 MPa, an average 28-day compressive strength of 50.8 MPa, and an average 28-day rupture strength of 5.1 MPa.

Comparative Example 4

The original cement of Example 13 was used, to which a sulfate swelling agent as the waterproof agent accounting for 10% by weight of the cement was added during the construction of subway engineering. However, as the salt corrosion at the sections which can be permeated by surface water was very serious, the maintenance thereof was rather troublesome.

The original cement had a standard consistency of 22.5%, an average initial setting time of 147 minutes, an average final setting time of 215 minutes, an average three-day compressive strength of 26.3 MPa, an average three-day rupture strength of 2.8 MPa, an average 28-day compressive strength of 48.6 MPa, and an average 28-day rupture strength of 4.8 MPa.

Analysis of Measurement Results:

From the results of Example 13 and Comparative Example 4 it can be known that, compared with Comparative Example 4, the product of Example 13 had significantly improved effects of resisting permeation and salt corrosion, achieving prefect effects. As to mechanical properties, the average 3-day compressive strength was improved by 5.6 MPa, and the average 28-day compressive strength was improved by 2.2 MPa.

Example 14

Raw materials used in this Example:

Cement: 42.5-grade cement, commercially available.

The modified bentonite of Example 5, silica fume, and a modified lignosulfonate water reducer commercially available were used.

In this example, the mass ratio of the modified bentonite to the silica fume to the water reducer was 100:20:3.

The cement capable of resisting permeation and salt corrosion of this example was prepared in the following way. The total amount of the bentonite and texturizer was 15% by weight of the total cement. During the blending of concrete, the bentonite powder, silica fume, and water reducer were measured and added, respectively.

The concrete capable of resisting permeation and salt corrosion which was produced by blending fully met the requirements of sewage treatment projects. No indication of leakage or salt corrosion was found over 3 years of observation, and thus the effects of resisting permeation and salt corrosion were satisfactory. The sugaring of the concrete had been significantly improved such that the phenomenon of sugaring did not appear substantially.

Example 15

In a Φ3.5×48 m dry process rotary kiln production line, the average daily output of clinker was 1750 t/d, and the average output per machine hour was 72.9 t/h. The waste gas that was collected by the kiln system passed through a humidifier tower, and then was dedusted by an electric dust collector. The total amount of the ash recycled by the humidifier tower and the electric dust collector was about 8.1 tons per hour, approximately accounting for 7% by weight of the total amount of raw materials that were fed into the kiln. The dust-collection of the raw material mill system employed a bag-type dust collector, and the recycled ash amount obtained by dedusting of the raw materials was about 6.7 tons. In the prior art, the recycled ash of the kiln system was fed together with the recycled ash of the raw materials via a raw material powder chute into a raw material homogenizing silo. The kiln condition was merely slightly influenced after the raw material powders were finely adjusted. In the case that the recycled ash of the kiln system was fed directly via a raw material elevator into the kiln when the raw material mill stopped, the kiln condition fluctuated violently, and thus the yield and quality were influenced a lot, frequently generating calcined clinker which was crusted and thickly granulated. The blending materials of 32.5-grade cement were mineral waste residue, coal cinder, and limestone, and the total amount of the blending materials accounted for 48% by weight of the cement. The granular blending materials were blended with clinker, gypsum at the grinding head and were fed into a cement mill for grinding. The finished 32.5-grade cement had an average initial setting time of 125 minutes, an average final setting time of 187 minutes, an average standard consistency of 24.1%, an average 3-day compressive strength of 17.6 MPa, an average 3-day rupture strength of 1.9 MPa, an average 28-day compressive strength of 36.6 MPa, and an average 28-day rupture strength of 3.7 MPa. When the cement was used, there was no slurrying, but sugaring or a large number of craquelure appeared.

The method of the present disclosure was used, wherein the recycled ash of the raw material mill was still fed into the raw material homogenizing silo, and the modified bentonite of Example 1 at an amount equal to 6% by weight of the recycled ash of the kiln system was continuously and evenly added to the recycled ash of the kiln system during the convey process and then fed into a steel silo near the cement mill as substituted blending slag powder. During blending in the cement mill, the total amount of blending materials was reduced from 48% to 43%, and the recycled ash modified by the bentonite powder at an amount equivalent to 5% by weight of the finished cement was continuously added into the ground powder from the cement mill, i.e. the amounts of clinker minerals and the blending materials in the finished cement powder were kept substantially equivalent to those of the original 32.5-grade cement, respectively. The cement blended with the recycled ash modified by the modified bentonite had an average initial setting time of 120 minutes, an average final setting time of 181 minutes, an average standard consistency of 24.2%, an average 3-day compressive strength of 20.7 MPa, an average 3-day rupture strength of 2.2 MPa, an average 28-day compressive strength of 37 Mpa, and an average 28-day rupture strength of 3.7 MPa, i.e. the average 3-day compressive strength was improved by 3 MPa, and the average 28-day strength was substantially unchanged. The construction or workability of said cement was improved, and substantially no sugaring or craquelure appeared.

Example 16

In a Φ3.3×47 m dry process rotary kiln production line, the average daily output of clinker was 1500 t/d, and the average output per machine hour was 62.5 t/h. The waste gas that was collected by the kiln system passed through a humidifier tower, and then was dedusted by an electric dust collector. The total amount of the recycled ash recycled by the humidifier tower and the electric dust collector was about 7 tons per hour, approximately accounting for 7% by weight of the total amount of raw materials that were fed into the kiln. The dust-collection of the raw material mill system employed a bag-type dust collector, and the recycled ash amount obtained by dedusting of the raw materials was about 6 tons. In the prior art, the recycled ash of the kiln system was fed together with the recycled ash of the raw materials via a raw material powder chute into a raw material homogenizing silo. The kiln condition was only lightly influenced after the raw material powders were finely adjusted. In the case that the recycled ash of the kiln system was fed directly via a raw material elevator into the kiln when the raw material mill stopped, the kiln condition fluctuated violently, and thus the yield and quality were influenced a lot, frequently generating calcined clinker which was crusted and thickly granulated. The blending materials of 32.5-grade cement were mineral waste residue, coal cinder, and coal ash, and accounted for 46% by weight of the cement. The granular blending materials were blended with clinker and gypsum at the grinding head and fed into a cement mill for grinding. The finished 32.5-grade cement had an average initial setting time of 136 minutes, an average final setting time of 201 minutes, an average standard consistency of 24.3%, an average 3-day compressive strength of 17.1 MPa, an average 3-day rupture strength of 1.9 MPa, an average 28-day compressive strength of 37.3 MPa, and an average 28-day rupture strength of 3.7 MPa. When the cement was used, there was no slurrying, but sugaring and a large number of craquelure appeared.

The method of the present disclosure was used, wherein the recycled ash of the raw material mill was still fed into the raw material homogenizing silo, and the modified bentonite of Example 2 at an amount equal to 7% by weight of the recycled ash of the kiln system was continuously and evenly added to the recycled ash of the kiln system during the convey process and then fed into a steel silo near the cement mill as substituted blending slag powder. During blending in the cement mill, the total amount of blending materials was reduced from 46% to 41%, and the recycled ash modified by the bentonite powder at an amount equivalent to 5% by weight of the finished cement was continuously added into the ground powder from the cement mill, i.e. the amounts of clinker minerals and the blending materials in the finished cement powder were kept substantially unchanged from those of the original 32.5-grade cement. The cement blended with the recycled ash modified by the modified bentonite had an average initial setting time of 126 minutes, an average final setting time of 191 minutes, an average standard consistency of 24.2%, an average 3-day compressive strength of 20.5 MPa, an average 3-day rupture strength of 2.2 MPa, an average 28-day compressive strength of 37.8 Mpa, and an average 28-day rupture strength of 3.9 MPa, i.e. the average 3-day compressive strength was improved by 3 MPa, and the 28-day strength was substantially unchanged. The construction or workability of said cement was improved, and substantially no sugaring or craquelure appeared.

Example 17

In a Φ3×45 m dry process rotary kiln production line, the average daily output of clinker was 1200 t/d, and the average output per machine hour was 50 t/h. The waste gas that was collected by the kiln system passed through a humidifier tower, and then was dedusted by an electric dust collector. The total amount of the ash recycled by the humidifier tower and the electric dust collector was about 5.9 tons per hour, approximately accounting for 7.5% by weight of the total amount of raw materials that were fed into the kiln. The dust-collection of the raw material mill system employed a bag-type dust collector, and the recycled ash amount obtained by dedusting of the raw materials was about 5 tons. In the prior art, the recycled ash of the kiln system was fed together with the recycled ash of the raw materials via a raw material powder chute into a raw material homogenizing silo. The kiln condition was merely slightly influenced after the raw material powders were finely adjusted. In the case that the recycled ash of the kiln system was fed directly via a raw material elevator into the kiln when the raw material mill stopped, the kiln condition fluctuated violently, and thus the yield and quality were influenced a lot, frequently generating calcined clinker which was crusted and thickly granulated. The blending materials of 32.5-grade cement were mineral waste residue, burned gangue, and limestone, and accounted for 45% by weight of the cement. The granular blending materials were blended with clinker and gypsum at the grinding head and fed into the cement mill for grinding. The finished 32.5-grade cement had an average initial setting time of 137 minutes, an average final setting time of 196 minutes, an average standard consistency of 23.4%, an average 3-day compressive strength of 18.5 MPa, an average 3-day rupture strength of 1.9 MPa, an average 28-day compressive strength of 38.6 MPa, and an average 28-day rupture strength of 3.8 MPa. When the cement was used, there was no slurrying, but sugaring and a large number of craquelure appeared.

The method of the present disclosure was used, wherein the recycled ash of the raw material mill was still fed into the raw material homogenizing silo, and the recycled ash of the kiln system as well as the modified bentonite of Example 3 was fed into a steel silo near the cement mill. As substituted blending slag, the adding amount of the recycled ash was 6% by weight of the finished cement, and the adding amount of the modified bentonite was 0.6% by weight of the finished cement. During blending in the cement mill, the total amount of blending materials was reduced from 45% to 38.4%, and the recycled ash modified by the bentonite powder at an amount equivalent to 6.6% by weight of the finished cement was continuously added into the ground powder from the cement mill, i.e. the amounts of clinker minerals and the blending materials in the finished cement powder were kept substantially unchanged from those of the original 32.5-grade cement, respectively. The cement blended with the recycled ash modified by the modified bentonite had an average initial setting time of 125 minutes, an average final setting time of 183 minutes, an average standard consistency of 23.8%, an average 3-day compressive strength of 20.9 MPa, an average 3-day rupture strength of 2.2 MPa, an average 28-day compressive strength of 38.5 Mpa, and an average 28-day rupture strength of 3.8 MPa, i.e. the average 3-day compressive strength was improved by 2.4 MPa, and 28-day strength kept substantially unchanged. The construction or workability of said cement was improved, and substantially no sugaring or craquelure appeared.

Example 18

In a Φ4.3×64 m dry process rotary kiln production line, the average daily output of clinker was 3250 t/d, and the average output per machine hour was 135.4 t/h. The waste gas that was collected by the kiln system passed through a humidifier tower, and then was dedusted by an electric dust collector. The amount of the ash recycled by the humidifier tower was about 8.6 tons per hour, approximately accounting for 4% by weight of the total amount of raw materials that were fed into the kiln. One single electric dust collector was used by the raw material system and the rear kiln for dust collection. After the raw material mill stopped, the total amount of the kiln system (i.e. the humidifier tower and electric dust collector) was about 15 t/h, approximately accounting for 7% by weight of the raw materials which were fed into the kiln. In the prior art, the recycled ash of the kiln system was fed together with the recycled ash of the raw materials via a raw material powder chute into a raw material homogenizing silo. The kiln condition was merely slightly influenced after the raw material powders were finely adjusted. In the case that the recycled ash of the kiln system was fed directly via a raw material elevator into the kiln when the raw material mill stopped, the kiln condition fluctuated violently, and thus the yield and quality were influenced a lot, frequently generating crusted or wrapped-up unfired clinker. In a manufacture workshop of the cement plant, the blending material and the clinker were ground to be clinker powder and slag powder respectively, and then blended homogeneously in a proper proportion, wherein the slag powder was prepared by blending mineral waste residue, coal cinder, with gypsum followed by grinding. The 42.5-grade cement was blended with 30% by weight of the slag powder and 70% by weight of the clinker powder. The finished 42.5-grade cement had an average initial setting time of 110 minutes, an average final setting time of 175 minutes, an average standard consistency of 22.3%, an average three-day compressive strength of 25.6 MPa, an average three-day rupture strength of 2.9 MPa, an average 28-day compressive strength of 48.9 MPa, and an average 28-day rupture strength of 4.7 MPa. When the cement was used, there was no slurrying, but sugaring appeared.

The method of the present disclosure was used, wherein the recycled ash of the humidifier tower of the kiln system was blended with the modified bentonite with the amount of 12% by weight of the recycled ash, and then conveyed into a steel silo in the manufacture workshop of the cement product to be used as a substituted slag powder. When the raw material mill stopped, the recycled ash that was collected by the humidifier tower and the electric dust collector of the kiln end was fed into a cement mill steel silo to be used as a substituted slag powder. When the blending clinker powder in the 42.5-grade cement was kept unchanged at 70%, the amounts of the slag powder were reduced from 30% to 28%, 26%, 24%, 22%, and 20% by weight, respectively, and the recycled ash modified by the modified bentonite was used to replace 2%, 4%, 6%, 8%, and 10% by weight of the slag powder, respectively, to obtain the 42.5- grade cement with recycled ash modified by modified bentonite as substitute slag powder. Compared with the original 42.5-grade cement containing slag powder with the amount of 30% by weight, the 42.5-grade cement blended with the recycled ash modified by the modified bentonite had an average initial setting time reduced by 5 to 15 minutes, an average final setting time reduced by about 10 minutes, a significantly changed average standard consistency, an average 3-day compressive strength increased by 2-4 MPa, an average 3-day rupture strength increased by 0.3-0.7 MPa, and an average 28-day strength substantially unchanged. When the cement obtained was used, substantially no sugaring or craquelure appeared.

Example 19

In a Φ4.8×74 m dry process rotary kiln production line, the average daily output of clinker was 5200 t/d, and the average output per machine hour was 216.7 t/h. The waste gas that was collected by the kiln system passed through a humidifier tower, and then was dedusted by an electric dust collector. The amount of the ash recycled by the humidifier tower was about 12 tons per hour, approximately accounting for 3.5% by weight of the total amount of raw materials that were fed into the kiln. One single electric dust collector was used by the raw material system and the rear kiln for dust collection. After the raw material mill stopped, the total amount of the kiln system (i.e. the humidifier tower and electric dust collector) was about 24 t/h, approximately accounting for 7% by weight of the raw materials fed into the kiln. In the prior art, the recycled ash of the kiln system was fed together with the recycled ash of the raw materials via a raw material powder chute into a raw material homogenizing silo. The kiln condition was merely slightly influenced after the raw material powders were finely adjusted. In the case that the recycled ash of the kiln system was fed directly via a raw material elevator into the kiln when the raw material mill stopped, the kiln condition fluctuated violently, and thus the yield and quality were influenced a lot, frequently generating crusted or wrapped-up unfired clinker. In a manufacture workshop of the cement plant, the blending materials and clinker were ground into cement powder, which was then blended with first level coal ash. That is, 42.5-grade and 32.5-grade cement products were blended with ground clinker powder containing slag and coal ash in different ratios. In the cement mill of the plant, 18% by weight of blending materials (mineral waste residue and coal cinder) batched with gypsum were ground into cement powder, wherein the 42.5-grade cement finished product were blended with 20% by weight of coal ash and 80% by weight of cement powder. The finished 42.5-grade cement had an average initial setting time of 127 minutes, an average final setting time of 198 minutes, an average standard consistency of 22.8%, an average three-day compressive strength of 26.2 MPa, an average three-day rupture strength of 2.8 MPa, an average 28-day compressive strength of 48.7 MPa, and an average 28-day rupture strength of 4.8 MPa. When the cement was used, there was no slurrying, but sugaring appeared.

The method of the present disclosure was used, wherein the recycled ash of the humidifier tower of the kiln system was blended with the modified bentonite with the amount of 15% by weight of the recycled ash, and then conveyed into a steel silo in the manufacture workshop of the cement product to be used as a substituted slag powder. When the raw material mill stopped, the recycled ash that was collected by the humidifier tower and the electric dust collector of the rear kiln was conveyed into a cement mill steel silo to be used as a substituted slag powder. In the 42.5-grade cement, the amount of cement powder was kept at 80% by weight of the cement, while the content of coal ash was reduced from 20% to 17%, 15%, 13%, and 10%, respectively. As a substitute of the reduced coal ash, recycled ash modified by the modified bentonite accounting for 3%, 5%, 7%, and 10% by weight of the cement were added, respectively. Compared with the original 42.5-grade cement containing slag powder with the amount of 20% by weight, the cement blended with the recycled ash modified by the modified bentonite had an average initial setting time reduced by 10 minutes, an average final setting time reduced by about 10 minutes, a significantly changed standard consistency, an average 3-day compressive strength increased by 2-4 MPa, an average 3-day rupture strength increased by 0.3-0.6 MPa, and an average 28-day strength substantially unchanged. Feedback from users indicated that the workability of said cement was obviously improved, and the phenomenon of sugaring substantially disappeared.

The invention claimed is:

1. A cement additive capable of resisting permeation and salt corrosion, consisting of a modified bentonite and a bentonite texturizer, wherein
the modified bentonite consists of bentonite and a bentonite modifier, wherein, the bentonite modifier consists of a water-soluble thiosulfate, a water-soluble alcohol compound, and a water-soluble amine compound, wherein the mass ratio of the thiosulfate to the alcohol compound to the amine compound is (0.3~1):(0.3~1):(0.3~1), and the content of the bentonite modifier is 0.2~5% of the bentonite by weight,
the bentonite has a crystalline structure,
the bentonite texturizer is a mixture of active silica powder and a water reducer, and
the amounts of the modified bentonite, the active silica powder, and the water reducer by weight are in the ratio of 100:(3~30):(0.3~3.5).

2. The additive of claim 1, wherein said active silica powder is at least one of fine powder with 80 μm screen residue ≤12% manufactured from a silicon industrial waste residue, an amorphous $SiO_2$ powder, and a natural $SiO_2$ mineral.

3. The additive of claim 1, wherein said water reducer is at least one selected from the group consisting of naphthalene-based water reducers, melamine sulfonate-based water reducers, polycarboxylate-based water reducers, sulfamate-based water reducers, and modified lignosulfonate-based water reducers.

4. A cement capable of resisting permeation and salt corrosion, comprising cement clinker, and the cement additive capable of resisting permeation and salt corrosion according to claim 1, wherein the content of said cement additive accounts for 4% to 20% of the total weight of the cement.

5. The cement capable of resisting permeation and salt corrosion of claim 4, wherein the content of said cement additive accounts for 5% to 15% of the total weight of the cement.

6. The additive of claim 2, wherein said amorphous $SiO_2$ powder is white carbon black, and said natural $SiO_2$ mineral is silica stone or diatomite.

7. The additive of claim 1, wherein the water-soluble thiosulfate is at least one selected from the group consisting of lithium thiosulfate, sodium thiosulfate, and potassium thiosulfate.

8. The additive of claim 1, wherein the water-soluble alcohol compound is at least one selected from the group consisting of polyol, polyvinyl alcohol, and polyethylene glycol.

9. The additive of claim 1, wherein the water-soluble amine compound is at least one selected from the group consisting of triethanolamine, isopropanol amine, hydrazine hydrate, water-soluble alkylamines, and alkenamides.

10. The additive of claim 8, wherein said polyol is ethylene glycol and/or isopropanol, and said polyethylene glycol is at least one selected from the group consisting of polyethylene glycol 200 (PEG 200), polyethylene glycol 400 (PEG 400), and polyethylene glycol 600 (PEG 600).

* * * * *